(No Model.)

C. CARLETON.
BOLT AND NUT LOCK.

No. 277,408. Patented May 8, 1883.

WITNESSES:
C. H. Leuthe Jr
M. H. Bligh

INVENTOR
Cyrus Carleton
by Joseph A. Miller & Co
Attys

UNITED STATES PATENT OFFICE.

CYRUS CARLETON, OF PROVIDENCE, RHODE ISLAND, ASSIGNOR TO THE BROWN & SHARPE MANUFACTURING COMPANY, OF SAME PLACE.

BOLT AND NUT LOCK.

SPECIFICATION forming part of Letters Patent No. 277,408, dated May 8, 1883.

Application filed October 9, 1882. (No model.)

*To all whom it may concern:*

Be it known that I, CYRUS CARLETON, of the city and county of Providence, and State of Rhode Island, have invented a new and useful Improvement in Bolt and Nut Locks; and I hereby declare that the following is a full, clear, and exact description of the same, reference being had to the accompanying drawings, forming part of this specification.

This invention has reference to an improvement in bolts and nuts, intended for use where the bolt and nut are subjected to jarring or tremulous motion and are liable to become loose—such bolts and nuts as are used upon fish-plates of railways, upon harvesters, steam-hammers, and in many other places where heretofore some kinds of nut-locks have been used.

The invention consists in the peculiar and novel form of the screw-thread on both the nut and bolt, by which the nut is made self-locking, as will be more fully set forth hereinafter.

Figure 1:
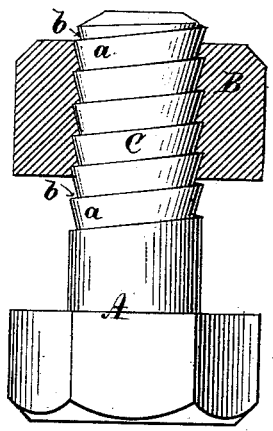
Figure 2:
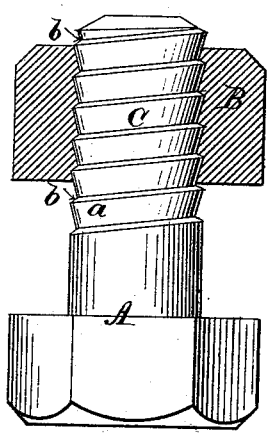
Figure 4:
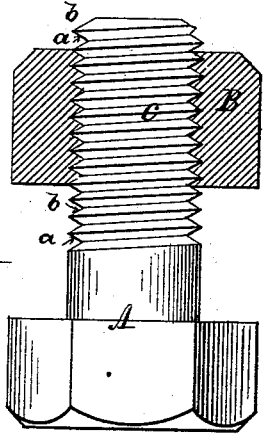
Figure 3:
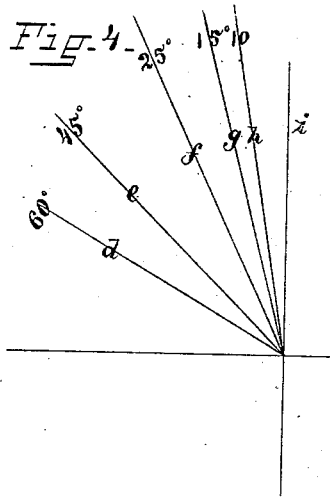

Figure 1 is a view of my improved bolt, showing a saw-tooth-section screw-thread and a corresponding nut in section. Fig. 2 is a view of a modified form of my improved bolt and nut. Fig. 3 is a view of the old form of bolt and nut. Fig. 4 illustrates the different angles of the screw-thread, against which the nut bears in the old and in the improved bolt.

The screw-threads for bolts used to secure two or more parts together have heretofore been made somewhat differing in section. Mr. Whitworth—a standard authority—makes the angle of the threads fifty-five degrees, with round top and bottom, while William Sellers—another standard authority—makes the angle of the thread sixty degrees, with flat top and bottom. When, as is usually the case, the maximum of strength with the minimum of material is the object sought in a screw-bolt, these sections of the screw-thread are no doubt desirable. In many instances where bolts are used rigid metal parts are held in fixed contact and little strain is exerted on the screw-threads, as the strain is not in the direction of the axis of the bolt, but across the same. In such cases it is necessary that the nut should be firmly held when the parts are brought to their fixed bearing, so that jarring or other motion will not loosen the bolt. Inventive skill has been prolific in devising ingenious devices for this purpose, and various kinds have been used to prevent the nut from turning on the bolt and lock the same.

The object of this invention is to form the screw-thread of a bolt and nut so that the nut, when turned against a firm bearing, will lock itself without the intervention of any other device.

In the drawings, A is the bolt, B the nut, and C the screw-thread.

$a$ is the face of the screw-thread, against which the nut bears when a strain is exerted on the nut by securing anything between the bolt-head and the nut. The inclination of this face in all screw-bolts has always been at an angle of more than forty-five degrees from the axial line of the bolt—usually from fifty-five to sixty degrees. In my improved bolt the inclination of the screw-face $a$ is less than forty-five degrees, and I prefer to make the same not more than twenty-five degrees.

$b$ is the upper face of the screw-thread, which may be square, at right angle to the face $a$, as is shown in Fig. 1, or beveled, as is shown in Fig. 2. The difference between the thread of these screw-bolts and that of ordinary bolts is that the face $a'$ of the ordinary bolt, as shown in Fig. 3, forms a bearing for the nut similar to the bearing on a rectangular screw-thread, whereas the bearing of the nut on the improved screw-thread is like the bearing of a mandrel in a conical hole fitting the mandrel. In fact, the screw-thread is a continuous spiral mandrel and the nut a hole provided with a spiral taper fitting the mandrel.

In Fig. 4, $d$ is the angle of sixty degrees, forming the face $a$ of the standard screw-thread. $e$ is the line of an angle of forty-five degrees. $f$ is a line making an angle of twenty-five degrees; $g$, an angle of fifteen degrees, and $h$ an angle of ten degrees from the perpendicular line $i$, being the face of the bolt.

My improved bolt is provided with what may be termed a "saw-tooth-section screw-thread," forming a spiral taper, on which the nut turns with the usual loose fit used in bolt-nuts, the taper being at an angle of less than forty-five degrees, and pointing toward the axis of the bolt in the direction of the head. The nut turns on this screw-thread readily until it is brought to a bearing, when, in turning it, it is forced tighter and tighter on the spiral incline until it becomes firmly fixed and locked, so that it will not turn until it is released by the wrench. It is as firmly fixed as a tapering mandrel is in a correspondingly-tapering hole, when it is brought to a firm bearing. This nut and bolt will firmly hold a fish-plate when screwed up, and will not get loose by the jarring of passing trains. It can be used on all kinds of machines and in all places where lock-nuts are used, and the screw-thread and nut can be placed above an ordinary screw-thread and nut, so as to be used for a jam-nut only.

When a nut of sufficient thickness is used, so that it can bear against a large number of the inclined threads of the bolt, the strength of the bolt and nut can be made equal or nearly equal to the ordinary bolt and nut; but there are many cases in which such strength in line of the axis of the bolt is not required.

I am aware that a screw has been formed with a thread having a surface inclined toward the head and axis of the screw at an angle of about forty-five degrees, and I lay no claim to such a screw.

Having thus described my invention, I claim as new and desire to secure by Letters Patent—

The combination, with a bolt having a screw-thread with a transverse surface tapering or inclined toward the axis and head of the bolt at an angle of forty-five degrees (or less) from the axis, of a nut having a corresponding internal thread, whereby when said nut is screwed toward the head of the bolt and against an abutment its thread will be jammed and practically locked by friction against the bolt-thread.

CYRUS CARLETON.

Witnesses:
M. F. BLIGH,
J. A. MILLER, Jr.